US012766775B2

(12) United States Patent
Dehlinger et al.

(10) Patent No.: US 12,766,775 B2
(45) Date of Patent: Oct. 20, 2026

(54) SYSTEMS AND METHODS OF CLEANING EXTRUDERS

(71) Applicant: ExxonMobil Chemical Patents Inc., Baytown, TX (US)

(72) Inventors: Stephen E. Dehlinger, Seabrook, TX (US); Brian P. Griset, Baytown, TX (US); Travis L. Brown, Pearland, TX (US); Bobi A Simonsen-Ginestra, Houston, TX (US); James T. Williams, Houston, TX (US); Kevin J. Leonard, Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 65 days.

(21) Appl. No.: 18/290,681

(22) PCT Filed: Jun. 22, 2022

(86) PCT No.: PCT/US2022/073095
§ 371 (c)(1),
(2) Date: Jan. 19, 2024

(87) PCT Pub. No.: WO2023/009921
PCT Pub. Date: Feb. 2, 2023

(65) Prior Publication Data

US 2024/0367363 A1 Nov. 7, 2024

Related U.S. Application Data

(60) Provisional application No. 63/203,580, filed on Jul. 27, 2021.

(51) Int. Cl.
*B29C 48/27* (2019.01)
*B29C 48/00* (2019.01)

(52) U.S. Cl.
CPC .......... *B29C 48/272* (2019.02); *B29C 48/022* (2019.02)

(58) Field of Classification Search
CPC ......... B29B 7/582; B29B 7/826; B29B 9/065; B29C 48/0022; B29C 48/022;
(Continued)

(56) References Cited

U.S. PATENT DOCUMENTS

| | | | |
|---|---|---|---|
| 3,799,178 | A | 3/1974 | Anderson et al. |
| 5,370,746 | A | 12/1994 | Pedersen et al. |

(Continued)

FOREIGN PATENT DOCUMENTS

| | | | |
|---|---|---|---|
| CN | 101961716 | | 1/2013 |
| CN | 206748818 | U * | 12/2017 |

(Continued)

OTHER PUBLICATIONS

CN210174151U machine translation (Year: 2020).*
(Continued)

*Primary Examiner* — Douglas Lee
(74) *Attorney, Agent, or Firm* — C. Tumey Law Group PLLC

(57) ABSTRACT

Methods for cleaning a die face for an extruder include: positioning an articulating tool adjacent the die face while the die face is installed on the extruder, the die face defining a plurality of die orifices; triggering operation of the articulating tool and thereby articulating an end effector coupled to the articulating tool; and contacting the end effector against one or more surfaces of the die face and thereby removing fouling from the die plate. Methods may include: pausing production of a polymer pellet product from the extruder when at least one of the pressure at the die or a polymer pellet product properties indicates fouling at the die; removing a polymer residue from one or more orifices
(Continued)

in the die with an articulating tool equipped with an end effector while the die is mounted on the extruder; and resuming production of the polymer pellet product.

19 Claims, 3 Drawing Sheets

(58) Field of Classification Search
CPC ....... B29C 48/04; B29C 48/05; B29C 48/272; B29C 48/2735; B29C 48/345; B29C 48/92
See application file for complete search history.

(56) References Cited

U.S. PATENT DOCUMENTS

| | | | | |
|---|---|---|---|---|
| 8,297,964 | B2 | 10/2012 | Pettitt, Jr. | |
| 9,149,954 | B2 | 10/2015 | Broughman | |
| 9,994,664 | B2 | 6/2018 | Uhl et al. | |
| 2005/0140044 | A1* | 6/2005 | Jackson | B29B 9/065 264/142 |
| 2016/0263799 | A1* | 9/2016 | Shiraishi | B29C 45/1753 |

FOREIGN PATENT DOCUMENTS

| | | | | |
|---|---|---|---|---|
| CN | 107745500 | A | | 3/2018 |
| CN | 108000747 | A | | 5/2018 |
| CN | 209007757 | U | | 6/2019 |
| CN | 210174151 | U | * | 3/2020 |
| CN | 213261016 | U | | 5/2021 |
| DE | 3814014 | | | 11/1989 |
| DE | 4422200 | A1 | | 1/1996 |
| EP | 1029601 | | | 8/2000 |
| JP | S56130826 | U | | 10/1981 |
| KR | 20120059842 | A | * | 6/2012 |
| KR | 102236659 | B1 | * | 4/2021 |

OTHER PUBLICATIONS

KR20120059842A machine translation (Year: 2012).*
CN206748818U machine translation (Year: 2017).*
KR102236659B1 machine translation (Year: 2021).*
Chinese Office Action for CN Patent Application No. 202280049779.9 dated Mar. 31, 2026. English Translation with Original Untranslated Version, PDF file. 18 pages.

* cited by examiner

SYSTEMS AND METHODS OF CLEANING EXTRUDERS

CROSS-REFERENCE OF RELATED APPLICATIONS

This application is a National Phase Application claiming priority to PCT Application Serial No. PCT/US2022/073095, filed Jun. 22, 2022, which claims the benefit of U.S. Provisional Application No. 63/203,580 filed Jul. 27, 2021, entitled "Systems and Methods of Cleaning Extruders", the entireties of which is are incorporated by reference herein.

FIELD OF THE INVENTION

The presently disclosed subject matter relates to extrusion machines and, more particularly, to systems and methods for removing fouling from an extruder die face while the die remains installed on the extruder.

BACKGROUND OF THE INVENTION

In polymer extrusion systems, a polymer may be converted to a molten state and forced through an extrusion die or die plate at high pressure, where the die plate has several (e.g., dozens, hundreds, thousands, etc.) of flow channels ending in small orifices (e.g., approximately 3 mm) that shape the molten polymer. As the polymer product exits the die plate, it contacts a cooling medium (usually water) and begins to solidify. Extrusion systems may also be equipped with a pelletizer that includes an array of rotating blades that cut the polymer exiting the die into small pellets. Pelletized polymer may then be carried by process water flowing across the die face to a centrifugal dryer where water is removed and dry pellets are discharged. Other systems may utilize processes in which the die face is not contacted by process water, such as water ring or strand pelletizing.

During operation, polymer residue and fouling can build up within the extrusion orifices of the die plate, which can lead to increased pressure at the die face, orifice blockage, and other process complications. Polymer fouling can also vary among polymer grades, and can increase for particular polymer types and with the use of various additives. As fouling of the die worsens over time, product quality can also change, leading to changes in polymer product appearance, density, pellet morphology, and performance.

Remediation of die fouling typically involves halting production and removal of the die plate for replacement and/or cleaning. Die plate cleaning can involve heating to burn off polymer materials, followed by the use of pressure, heat, fluids, and/or chemicals. Cleaning methods often involve grinding the die plate surface, which can remove a portion of the die plate face and reduces the service life of the die plate. While methods of cleaning and renovating die surfaces can vary, all can result in economic losses associated with material costs and lost production time.

Some references of potential interest in this regard include: U.S. Pat. Nos. 3,799,178; 8,297.964; 9,149,954; and 9,994,664; as well as CN101961716, EP 489783B; EP 1029601A; and DE 3814014A.

SUMMARY OF THE INVENTION

The present invention is directed to systems and methods for removing fouling from an extruder die face while the die remains installed on the extruder.

In an aspect, methods for cleaning a die face for an extruder include: positioning an articulating tool adjacent the die face while the die face is installed on the extruder, the die face defining a plurality of die orifices; triggering operation of the articulating tool and thereby articulating an end effector coupled to the articulating tool; and contacting the end effector against one or more surfaces of the die face and thereby removing fouling from the die plate.

In another aspect, methods for extending the service life of a die installed on an extruder include: pausing production of a polymer pellet product from the extruder when at least one of the pressures at the die or a polymer pellet product property indicates fouling at the die; removing a polymer residue from one or more orifices in the die with an articulating tool equipped with an end effector while the die is mounted on the extruder; and resuming production of the polymer pellet product.

DETAILED DESCRIPTION OF THE INVENTION

The present disclosure is directed to methods for cleaning a die plate installed on an extruder and extending the service life of a die prior to replacement. Particularly, methods disclosed herein may include removing polymer fouling from at least one extrusion orifice of a mounted die using an articulating tool equipped with an end effector.

Figure 1:
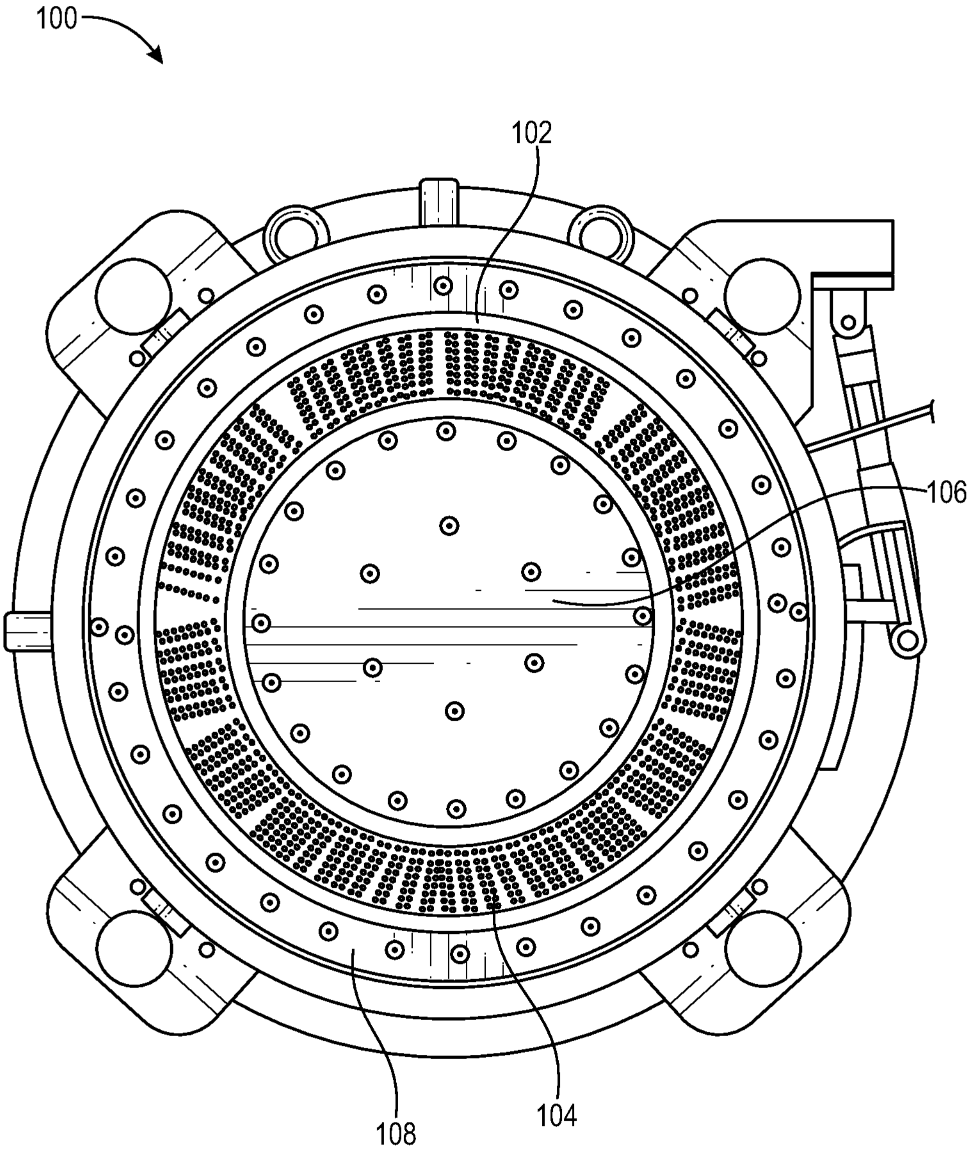
FIG. 1 is an illustration showing the exit face of an example die plate assembled on an extruder.

During a polymer extrusion process, polymer is passed through the body of an extruder where the polymer is heated above its melting point or glass transition temperature and converted to a molten state. The molten polymer is then passed to a die plate and through a series of passages or channels of relatively minute cross-sectional areas. FIG. 1 is a schematic end view of an example extruder assembly 100 with an installed die plate 102. A die exit face 104 of the die plate 102 includes a die center cover plate 106 and an outer cover ring 108, which provide a number of features containing extrusion orifices that shape extruded polymer product. Die plate 102 may also be engaged with a pelletizer (not shown) that includes an array of blades that cut the extruded polymer, which is then collected and processed to form a final polymer pellet product.

Figure 2:
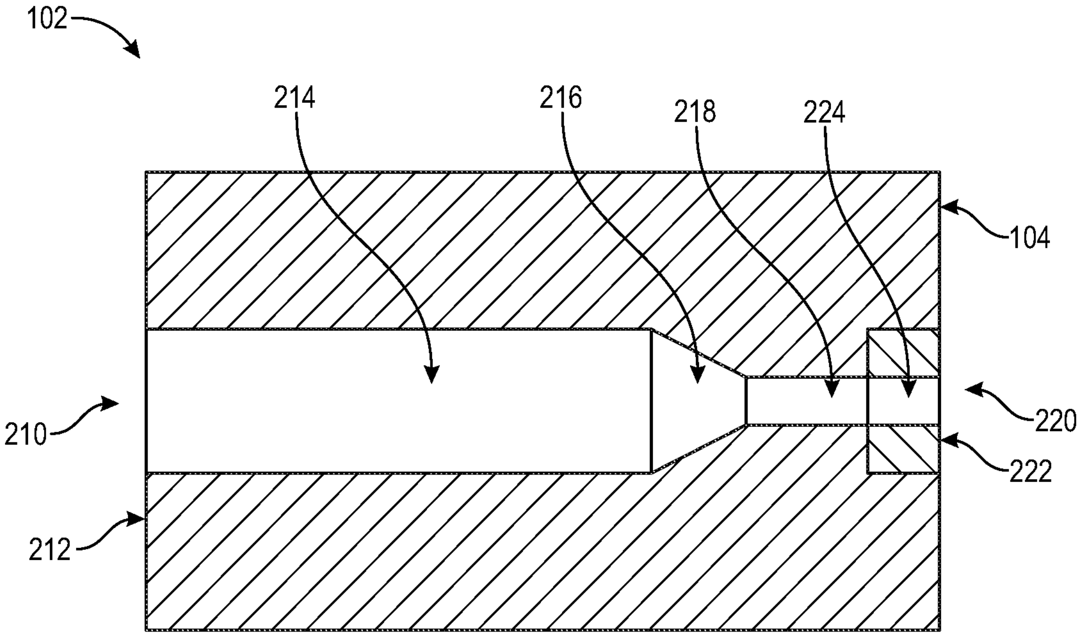
FIG. 2 is a cross-sectional view of a portion of a die plate showing an example flow channel having a pocket terminating in a single land and extrusion orifice.

Die plate 102 may include or otherwise define a number of channels and passages that serve to collect and shape the molten polymer during the extrusion process. FIG. 2 is a cross-sectional side view of a segment of the die face 102. As illustrated, the die face 102 provides an entrance face 212 positioned opposite the die exit face 104. Moreover, the die plate 102 may define an extrusion channel 210 extending between the entrance face 212 and the die exit face 104, and thus forming a passageway for material to flow through the die plate 102. During extrusion, molten polymer is driven through the extruder and the polymer encounters entrance face 212 and begins to collect in one or more pockets (or slots) 214. The collected polymer is then introduced by way of taper 216 to one or more landings 218 that terminate in an extrusion orifice 220 defined at the die exit face 104.

Die exit face 104 may also include a wear face 222 that is affixed thereto and that defines an orifice 224 that is co-linear with extrusion orifice 220. The type of wear face 222 is not particularly limited and die plates disclosed herein may include nibs (such as that pictured in FIG. 2) that are embedded within the die exit face 104 proximate a single extrusion orifice 220, but may also include wear faces that define multiple orifices that are assembled or embedded on exit face 104, including tiles, caterpillar nibs, or monolithic wear faces that substantially cover die exit face 104. In another variation, die exit face 104 may be formed from a wear-resistant material such that die exit face 104 and wear face 222 are the same structure.

Figure 3:
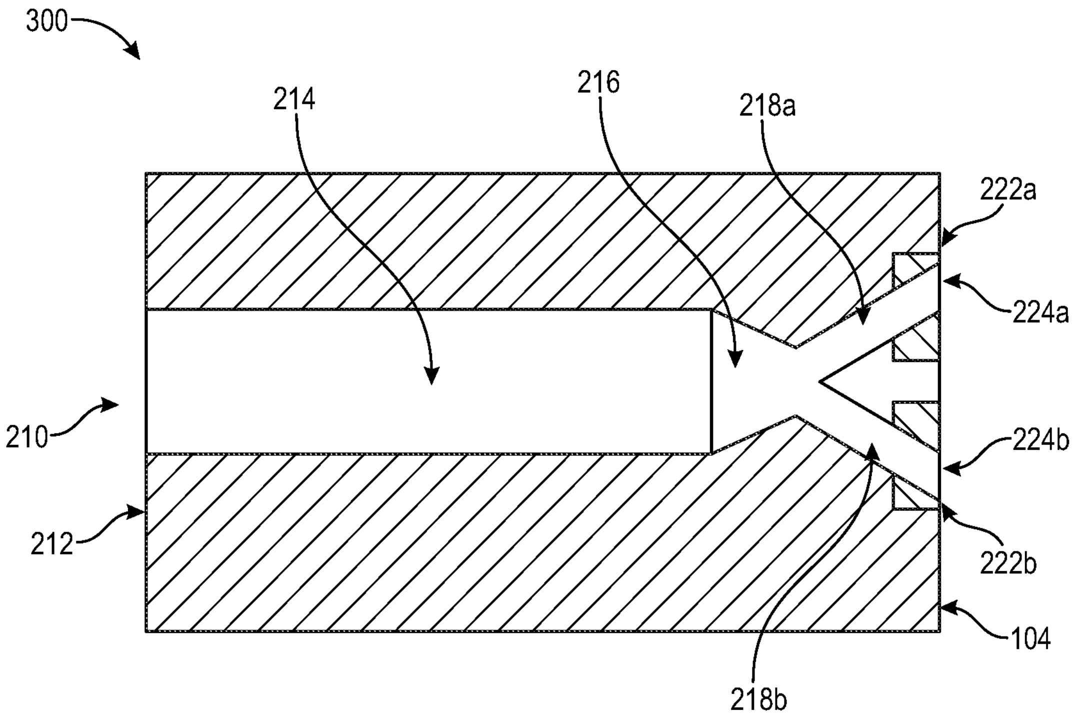
FIG. 3 is a cross-sectional view of a portion of a die plate showing an example flow channel having a pocket terminating in multiple lands and extrusion orifices.

Alternative die plate designs may include extrusion orifices having angled or deviated landings, such as when multiple extrusion orifices and lands stem (extend) from a single pocket 214 provided in a die plate. FIG. 3 is a cross-sectional side view of a die wear face segment 300, illustrating a die variation in which multiple lands **218*a* and 218*b* extend from a single pocket 214. Similar to the structure shown in FIG. 2, an extrusion channel 210 extends between the entrance face 212 of the die plate 102 and the exit face 104. During extrusion, molten polymer is driven through the extruder and the polymer encounters entrance face 102 and collects in pocket (or slot) 214. However, as the polymer collects in pocket 214, taper 216 feeds the molten polymer into multiple lands 218*a* and 218*b*, which extend to orifices 224*a* and 224*b*, respectively. In this example, die exit face 104 may also include wear faces 222*a* and 222*b* that define extrusion orifices 224*a* and 224*b***.

During normal operation of an extruder equipped with a pelletizer system, control over polymer pellet size and distribution is handled in a number of ways including internal die geometry design, and monitoring the pressure and polymer flow at the die face for changes during production. Over time, pellet size and product quality may be affected by a number of process conditions, including fouling from the deposition of degraded polymer residues, polymer additives, processing aids, anti-oxidants, colorants, anti-static reagents, and fillers such as talc, diatomaceous earth, calcium carbonate, and the like. Fouling can occur with many different types of polymer grades and/or with the use of polymer additives, particularly for low melt index polymers that exhibit high viscosity, such as a polymer having a melt index as determined by ASTM D1238 (190° C., 2.16 kg) of about 5 g/10 min or less, about 7 g/10 min or less, or about 10 g/10 min or less.

Fouling of die surfaces and extrusion orifices can cause quality issues that manifest in a number of ways, including reduced bulk density, non-uniform pellet sizing, the formation of underweight and minute pellets (chips), reduced pellet diameter, the formation of tails, excessive pellet length, string/strip formation, creation of aggregates/clusters, and increased melt fracture, particularly in metallocene catalyzed polymers. Over time, fouling can also cascade into the occlusion of one or more die orifices, leading to reduced production rates and increased pressure at the die face.

Conditions at the die face may be monitored during extruder operation and, in some cases, extrusion dies are inspected, removed, and cleaned following the end of the production run or upon shutting down to prevent damage from polymer hardening within the die. For some polymer types and grades, extrusion dies may require cleaning prior to ending the production run as pressure at the die face reaches alarm limits and/or product quality degrades to an unacceptable level. In any case, die cleaning typically involves stopping production and removing the die plate for replacement and/or cleaning by one or more techniques that may include oven pyrolysis, high temperature bead bath, manual polishing, paste polishing, grinding, and the like.

Methods disclosed herein may include removing fouling from a die exit face such that one or more extrusion orifices on the die exit face are substantially cleaned without removing the die plate from the extruder. As used herein, the term "substantially clean," and variations thereof, means that the extrusion orifices and at least part of the extrusion channel (land and/or pocket) have been contacted by an articulating tool equipped with an end effector to remove fouling. In some cases, the extrusion orifices may also be visually inspected to verify removal. As used herein, "fouling" refers to residues and materials that accumulate within extrusion orifices of a die plate and restrict, impede, or alter the flow of polymer through the die. Fouling may be composed of polymer aggregates and degradation products, and may also include various amounts of process additives and reagents.

Articulating tools that may be used to perform the methods disclosed herein may include a variety of removably attached end effectors used to remove polymer residues from the extrusion orifices and channels within a mounted die. Articulating tools may include any handheld or mounted machine capable of manipulating (articulating) the end effector, where manipulating includes any one or more of rotation, reciprocation, oscillation, vibration, and the like. Articulating tools may be designed to incorporate multiple end effectors such that more than one extrusion orifice is cleaned simultaneously. Non-limiting examples of articulating tools may include rotary drills, reciprocating air hammers, rotary tools, oscillating tools, manual/hand tools, and the like.

End effectors disclosed herein may include any removable attachment or bit compatible with (in the sense of being able to be attached to, preferably removably attached to) an articulating tool and capable of removing polymer residue from an extrusion orifice of a die face by mechanical action, such as brushing, scraping, polishing, drilling, abrading, grinding, reaming, and the like. Suitable end effectors may be dimensioned such that they can enter at least partially within one or more extrusion orifices (e.g., orifice 220 or orifices **224*a* and 224*b* of FIGS. 2 and 3, respectively) in order to remove fouling from one or more of the surfaces near the extrusion orifice, die landing, and/or pocket. In some cases, end effectors may be flexible, such as a flexible brush or wire, or curved and capable of reaching lands and/or pockets that are deviated or angled with respect to the axis of the extrusion orifice. For example, a flexible end effector may be useful in cases where a die plate incorporates designs having angled, curved, slanted, and/or deviated die pockets and landings, such as that shown in FIG. 3**. The type of end effector is not considered particularly limited, and suitable end effectors may include brushes, rotary brushes, wire brushes, reamers, grinding bits, files, polishing bits, sandpaper or grit-based rotary bits, and drill bits.

Figure 4:
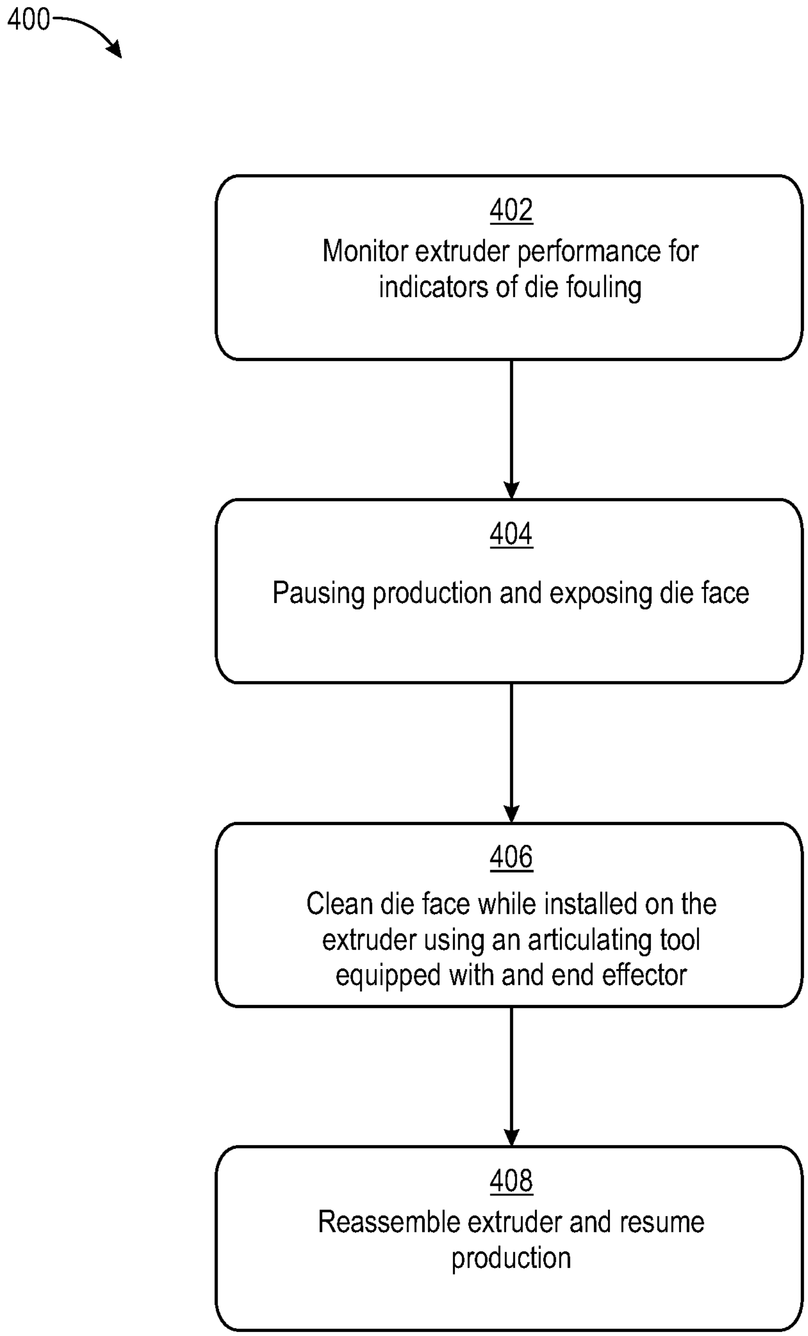
FIG. 4 is a schematic flowchart illustrating a cleaning method in accordance with the present disclosure.

FIG. 4 is a schematic flowchart of an example method 400 of cleaning a polymer extruder die, according to one or more embodiments. The method 400 may optionally include a step of monitoring extruder performance at 402, such as by monitoring pressure and/or polymer product properties, for indicators of die fouling. Once die fouling has been identified and/or begins to impact extruder operation, production may be paused and the die face of the extruder exposed for cleaning, as at 404. This may entail, for example, pausing polymer flow from the extruder, stopping water circulation within the pelletizer, and exposing the die exit face by dissociating the pelletizer cart and any additional processing and/or discharging equipment from the extruder. Once the die exit face is accessible, cleaning at 406 is performed such that fouling is removed using an articulating tool equipped with an end effector from one or more extrusion orifices by mechanical action.

During cleaning at 406, the end effector attached to the articulating tool may be inserted into a given extrusion orifice. Once received within the orifice, or prior to receipt therein, the articulating tool may be activated to commence actuation of the end effector. Activation of the articulating tool may induce the end effector to remove fouling by, for example, reciprocating and/or abrading surfaces within the orifice. In another example, activation of the articulating tool may cause the end effector to rotate about a central axis and the operator may manually reciprocate the end effector within the extrusion orifice while the end effector rotates. The articulating tool may be re-positioned when needed to contact all surfaces accessible from the orifice, including, for example, lands, pockets, and/or wear face surfaces. Once the extrusion orifice is sufficiently cleaned, the operator may remove the end effector from the orifice and repeat the process on a second or adjacent extrusion orifice. Cleaning methods disclosed herein may be performed manually by an operator at the die face that positions an articulating tool near the die face, or as an automated process in which an articulating tool is mounted to a robot that positions and operates the articulating. The articulating tool and/or end effector may be reused for a different extrusion orifice or changed at any time during this procedure.

Following removal of the polymer and fouling such that the die plate is substantially cleaned, the extruder is reassembled at 408 and production may be resumed. Cleaning methods disclosed herein may include treatment of all extrusion orifices on the die face, or only a subset of extrusion orifices. Examples in which only a subset of extrusion orifices are cleaned may include a targeted cleaning of a particular section of die face due to time. Cleaning methods disclosed herein may also be practiced prior to removal and reconditioning of a die plate, such as by "baking out" polymer from a die.

In some cases, die cleaning methods may be performed while the die plate is actively heated. While not shown, a die plate may include radially oriented passages distributed near the die exit face for circulating steam or oil to supply heat to the die plate. During production, the die plate is heated to offset heat losses during production and prevent polymer solidification within the extrusion channels as the molten polymer traverses the die plate. During cleaning methods, the die plate may be optionally heated up to (or above) the melt temperature of the polymer, such as within a range of about 93° C. to about 225° C. or above, to soften fouling materials such as polymer residues, to aid removal.

As noted above, methods disclosed herein may include monitoring extruder performance for signs of die fouling. During operation, an extruder may be monitored for signs of fouling by one or more suitable methods, such as monitoring pressure at the die face, inspection of the die face, polymer pellet product quality monitoring, and the like. Extrusion processes disclosed herein may also extend the service life of an extruder by monitoring the die and/or product quality for signs of die fouling, pausing production when fouling is detected, removing polymer residue from one or more orifices in the die with an articulating tool equipped with an end effector while the die is mounted on the extruder, and resuming extruder operations.

As noted, monitoring for signs of fouling may include monitoring pressure; in particular, an increasing pressure trend can indicate fouling and potentially also die damage. Pressure operating ranges can vary for polymer type and grade, and fouling may occur more frequently with low melt index and high viscosity polymers and with the use of some polymer additives. Die fouling may be indicated by an increase of pressure at the die, when compared to pressure measurements obtained for a new or cleaned die, by about 10% or more, about 20% or more, or about 30% or more. Following cleaning methods disclosed herein, pressure at the die may be reduced by at least about 10%, at least about 20%, or about 30%.

Fouling of an extruder die may also be monitored by inspection (e.g., visually or by an automated process such as by using an optical sensor) and calculating the percentage of open or occluded extrusion orifices. Cleaning methods may be performed, for example, where the percentage of open extrusion orifices (die freezing ratio) is below about 95%, below about 90%, or below about 85%.

The properties of the pelletized polymer product may also be used to monitor fouling and determine when die plate cleaning is needed. For example, fouling may be determined qualitatively by the appearance of misshapen pellets, non-uniform pellet sizing, reduced pellet diameter, melt fracture, pellet tails, or the formation of aggregates or strings. Quantitative methods may also be used, such as by monitoring the concentration of malformed pellets, such as chips, and determining fouling on a percentage basis, wherein an increase in malformed pellets indicates the presence of fouling in the die face. In a particular example, die fouling may be indicated by monitoring for polymer pellet products with weight well below the average weight of all polymer pellet products; specifically, fouling may be indicated by monitoring pellets over a given period of time and determining that at least 5%, 10%, or 15% of polymer pellet products discharged during the time period have weight that is 10% or less of the average weight of all polymer pellet products discharged during that time period.

Die cleaning methods disclosed herein may prolong the service life of an extruder die, where the service life is defined as the time span between installations of a new die until die removal. Die service life may be measured in months or, in some cases, tons of material processed per die hole. In some cases, die cleaning methods may be repeated multiple times prior to die replacement, including as a non-limiting example up to about six times before the extruder die is removed, with the time after each cleaning being considered an extension of die service life. For example, die life extension may be about 328% for a die cleaned by repeating the cleaning methods five times, or about 65% extension per brushing. Cleaning methods disclosed herein may extend the service life of an extruder die by about at least 50%, about at least 100%, or about at least 300%. While example ranges are provided, the number of repeated cleanings (and calculated die service life extension) may be more or less depending on a number of factors such as polymer type and grade, die geometry, extruder type, and effectiveness of the cleaning effort.

Methods disclosed herein may be employed to clean any compatible extruder die face, and the type of polymer system being extruded is not particularly limited and may include any thermoplastic and/or elastomer suitable for extrusion. Examples of suitable polymer systems include polyolefins, such as low, intermediate, or high density polyethylene, polypropylene, polybutene-1, poly-3-methylbutene-1, poly-4-methylpentane-1, copolymers of monoolefins with other olefins (mono or diolefins) or vinyl monomers such as ethylene-propylene copolymer or with one or more additional monomers, such as ethylene propylene diene monomer rubber, ethylene/butylene copolymer, ethylene/vinyl acetate copolymer, ethylene/ethyl acrylate copolymer, propylene/4-methylpentene-1 copolymer, and the like.

Other polymer systems may include thermoplastic elastomers such as the "block" copolyesters from terephthalate, 1,4-butanediol and poly(tetramethylene ether)glycol; polystyrene; polystyrene polyphenylene oxide blends; polyesters such as polyethylene terephtalate, poly 1,4-butylene terephthalate, poly 1,4-cyclohexyldimethylene terephthalate, and poly 1,3-propylene terephtalate; polyamides such as nylon-6,6, nylon-6, nylon-12, nylon-11, and aromatic-aliphatic copolyamides; polycarbonates such as poly bisphenol-A carbonate; fluorinated polymers such as copolymers of tetrafluoroethylene and hexafluoropropylene, polyvinyl fluoride, copolymers of ethylene and vinylidene fluoride or vinyl fluoride; polysulfides such as poly p-phenylene sulfide; polyetherketones; polyetheretherketones; polyetherketoneketones; polyetherimides; acrylonitrile-1,3-butadinene-styrene copolymers; (meth)acrylic polymers such as polymethyl methacrylate; and chlorinated polymers such as polyvinyl chloride.

Polymer systems may also include extrudable elastomers, including natural rubber, polyisobutylene, butyl, chlorobutyl, polybutadiene, butadiene-styrene, ethylene-propylene, ethylene-propylene diene terpolymer elastomers and mixtures thereof with each other and with thermoplastic polymers. Blends of any of the above suitable polymer systems are also within the scope of this disclosure.

Embodiments disclosed herein include:

A. Methods of cleaning a die face for an extruder, the methods comprising: positioning an articulating tool adjacent the die face while the die face is installed on the extruder, the die face defining a plurality of die orifices; triggering operation of the articulating tool and thereby articulating an end effector coupled to the articulating tool; and contacting the end effector against one or more surfaces of the die face and thereby removing fouling from the die plate.

B. Methods of extending the service life of a die installed on an extruder, the methods comprising: pausing production of a polymer pellet product from the extruder when at least one of the pressures at the die or a polymer pellet product property indicates fouling at the die; removing a polymer residue from one or more orifices in the die with an articulating tool equipped with an end effector while the die is mounted on the extruder; and resuming production of the polymer pellet product.

Embodiments A and B may have one or more of the following additional elements in any combination:

Element 1: wherein the articulating tool is a rotary drill.

Element 2: wherein the end effector is a rotary brush.

Element 3: wherein removing the polymer residue reduces a pressure at the die face by at least about 10% as compared to pressure at the die face prior to removing the polymer residue.

Element 4: wherein removing the polymer residue reduces a pressure at the die face by at least about 20% as compared to pressure at the die face prior to removing the polymer residue.

Element 5: wherein at least one of the plurality of die orifices is fluidly connected to a deviated or angled land.

Element 6: the method further comprising heating the die face to a temperature in a range of about 93° C. to about 121° C.

Element 7: wherein the polymer residue comprises a polymer having a melt index as determined by ASTM 1238-13 of about 5 or less.

Element 8: wherein the polymer residue comprises a polymer selected from a group consisting of low density polyethylene, intermediate density polyethylene, high density polyethylene, polypropylene, polybutene-1, poly-3-methylbutene-1, poly-4-methylpentane-1, ethylene-propylene, ethylene propylene diene monomer rubber, ethylene/butylene copolymer, ethylene/vinyl acetate copolymer, ethylene/ethyl acrylate copolymer, propylene/4-methylpentene-1 copolymer, poly(tetramethylene ether)glycol, polystyrene, polystyrene polyphenylene oxide blends, polyesters, polyamides, aromatic-aliphatic copolyamides, polycarbonates, polyvinyl fluoride, copolymers of ethylene and vinylidene fluoride or vinyl fluoride, polysulfides, polyetherketones, polyetheretherketones, polyetherketoneketones, polyetherimides, acrylonitrile-1,3-butadinene-styrene copolymers, (meth)acrylic polymers, and chlorinated polymers.

Element 9: wherein positioning the articulating tool adjacent the die face comprises manually positioning the articulating tool adjacent the die face.

Element 10: wherein the articulating tool is mounted to a robot and positioning the articulating tool adjacent the die face comprises positioning the articulating tool adjacent the die face by an automated process.

Element 11: wherein contacting the end effector against the one or more surfaces of the die face comprises reciprocating the end effector within at least one of the plurality of die orifices.

Element 12: wherein fouling at the die is indicated by an increase of pressure at the die by about 20% or more.

Element 13: wherein fouling at the die is indicated by the polymer product properties in which a percentage of the polymer pellet product having a weight that is about 10% of an average pellet weight is at least about 10%.

By way of non-limiting example, exemplary combinations applicable to A and B include, but are not limited to, 1 and any one or more of 2 to 13; 2 and any one or more of 1 and 3 to 13; 3 and any one or more of 1 to 2 and 4 to 13; 4 and any one or more of 1 to 3 and 5 to 13; 5 and any one or more of 1 to 4 and 6 to 13; 6 and any one or more of 1 to 5 and 7 to 13; 7 and any one or more of 1 to 6 and 8 to 13; 8 and any one or more of 1 to 7 and 9 to 13; 9 and any one or more of 1 to 8 and 10 to 13; 10 and any one or more of 1 to 9 and 11 to 13; 11 and any one or more of 1 to 10 and 13; 12 and any one or more of 1 to 11 and 13; 13 and any one or more of 1 to 12.

The disclosure is further illustrated by means of the following, non-limiting example.

Example 1: Die Cleaning by Brush-Equipped Rotary Drill

In this example, two commercial extruders used in the production of polyethylene were cleaned by methods in accordance with the present disclosure. Tests 1 and 2 were performed on underwater pelletizers equipped with a 3052 orifice die and a 3752 orifice die, respectively. Each extruder was operated until the die fouling began to impact pellet appearance and the pressure at the die face reached about 35% to about 40% over the initial operating pressure after previous die replacement.

Production on each extruder was paused and the pelletizer cart was removed to expose the die face. A rotary hand drill equipped with a flexible wire brush was then used to remove polymer fouling from each extrusion orifice. Fouling removal was determined by performance of the cleaning method and/or visual inspection. The extruders were then reassembled and production was resumed. Changes in pressure at the die face were recorded prior to and following cleaning. Die pressure changes following cleaning were also compared with measurements following complete die replacement under similar conditions. Process data improvement is shown in Table 1. In Test 2, the asterisk indicates a catalyst change was performed during extruder downtime, indicating that the operating pressure at the die face did not change substantially in response to the change in catalyst.

TABLE 1

Extruder process data for Example 1

| Test | Die pressure decrease after die cleaning (same rate and grade) | Die pressure decrease after normal die changes (same rate and grade) | Pellet cut % increase from cleaning | Die life extension predicted from die cleaning |
|---|---|---|---|---|
| 1 | 230 psig (15%) | 700 psig (35%) | 0% (driven by 0-1% chips pre- and post-brushing) | ~1 month (38%) |
| 2 | 420 psig (27%)* | 750 psig (40%) | 14% (driven by reduction in % chips) | ~1.5 months (71%) |

The increase in pellet cut percentage for each extruder following cleaning was also analyzed, w % here pellet cut percentage increase was calculated as the change in percentage of acceptable pellets (not misshapen, for example) divided by the total amount of pellets. For Test 1, there was no observed change in the pellet cut percentage increase, largely because the initial amount of chips (underweight and/or misshapen pellets that can be about 10% of weight of a normal (average) pellet) was negligible prior to cleaning. For Test 2 there was an increase of 14%, indicating a significant improvement in polymer pellet quality.

Another factor analyzed was the die life extension predicted from die brushing. Die life extension was estimated based on the time from cleaning until die fouling reaches a point at which the die is cleaned in place by methods disclosed herein or removed and replaced. As shown in Table 1, the reduction in fouling and die pressure provides an estimated extension of die service life of 1 month for Extruder 1 and 1.5 months for Extruder 2.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently. "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

What is claimed is:

1. A method of cleaning a die face for an extruder, the method comprising:

pausing production of a polymer pellet product from the extruder when a polymer pellet product property indicates fouling at the die, wherein the fouling at the die is indicated by monitoring the polymer pellet product property comprising weight of the polymer pellet product over a period of time, and determining that at least 10% of the polymer pellet product produced over the period of time has weight that is less than or equal to 10% of the average weight of all polymer pellet product produced over the period of time;

exposing the die face via at least one of dissociating a pelletizer cart or discharging equipment from the extruder;

positioning an articulating tool adjacent the die face while the die face is installed on the extruder, the die face defining a plurality of die orifices;

triggering operation of the articulating tool and thereby articulating an end effector coupled to the articulating tool; and contacting the end effector against one or more surfaces of the die face and thereby removing fouling from the die plate.

2. The method of claim 1, wherein the articulating tool is a rotary drill.

3. The method of claim 1, wherein the end effector is a rotary brush.

4. The method of claim 1, wherein removing the fouling comprising polymer residue reduces a pressure at the die face by at least about 10%, as compared to pressure at the die face prior to removing the polymer residue.

5. The method of claim 4, wherein the polymer residue comprises a polymer having a melt index as determined by ASTM D1238 (190° C., 2.16 kg) of about 5 g/10 min or less.

6. The method of claim 4, wherein the polymer residue comprises a polymer selected from a group consisting of low density polyethylene, intermediate density polyethylene, high density polyethylene, polypropylene, polybutene-I, poly-3-methylbutene-1, poly-4-methylpentane-1, ethylene-propylene, ethylene propylene diene monomer rubber, ethylene/butylene copolymer, ethylene/vinyl acetate copolymer, ethylene/ethyl acrylate copolymer, propylene/4-methy 1 pentene-1 copolymer, poly(tetramethylene ether)glycol, polystyrene, polystyrene polyphenylene oxide blends, polyesters, polyamides, aromatic-aliphatic copolyamides, polycarbonates, polyvinyl fluoride, copolymers of ethylene and vinylidene fluoride or vinyl fluoride, polysulfides, polyetherketones, polyetheretherketones, polyetherketoneketones, polyetherimides, acrylonitrile-1,3-butadinene-styrene copolymers, (meth)acrylic polymers, and chlorinated polymers.

7. The method of claim 1, wherein at least one of the plurality of die orifices is fluidly connected to a deviated or angled land.

8. The method of claim 1, further comprising heating the die face to a temperature in a range of about 93° C. to about 225° C. while contacting the end effector against the one or more surfaces of the die face.

9. The method of claim 1, wherein positioning the articulating tool adjacent the die face comprises manually positioning the articulating tool adjacent the die face.

10. The method of claim 1, wherein the articulating tool is mounted to a robot and positioning the articulating tool adjacent the die face comprises positioning the articulating tool adjacent the die face by an automated process.

11. The method of claim 1, wherein contacting the end effector against the one or more surfaces of the die face comprises reciprocating the end effector within at least one of the plurality of die orifices.

12. The method of claim 1, wherein the polymer pellet product property indicating the fouling comprises weight of the polymer pellet product over a period of time.

13. A method of extending the service life of a die installed on an extruder, the method comprising:

pausing production of a polymer pellet product from the extruder when a polymer pellet product property indicates fouling at the die wherein the fouling at the die is indicated by monitoring the polymer pellet product property comprising weight of the polymer pellet product over a period of time, and determining that at least 10% of the polymer pellet product produced over the period of time has weight that is less than or equal to 10% of the average weight of all polymer pellet product produced over the period of time;

removing a polymer residue from one or more orifices in the die with an articulating tool equipped with an end effector while the die is mounted on the extruder; and resuming production of the polymer pellet product.

14. The method of claim 13, wherein fouling at the die is indicated by an increase of pressure at the die by about 20% or more.

15. A method of extending the service life of a die installed on an extruder, the method comprising:

pausing production of a polymer pellet product from the extruder when at least one of the pressures at the die or a polymer pellet product property indicates fouling at the die;

removing a polymer residue from one or more orifices in the die with an articulating tool equipped with an end effector while the die is mounted on the extruder; and resuming production of the polymer pellet product, wherein fouling at the die is indicated by monitoring weight of the polymer pellet product over a period of time, and determining that at least 10% of the polymer pellet product produced over the period of time has weight that is less than or equal to 10% of the average weight of all polymer pellet product produced over the period of time.

16. The method of claim 13, wherein removing the polymer residue reduces the pressure at the die by at least about 10% as compared to the pressure at the die prior to removing the polymer residue, and wherein the polymer residue was deposited by a polymer having a melt index as determined by ASTM D1238 (190° C., 2.16 kg) of about 5 g/10 min or less.

17. The method of claim 13, wherein the polymer pellet product property indicating the fouling comprises weight of the polymer pellet product over a period of time.

18. The method of claim 13, wherein the articulating tool is a rotary drill.

19. The method of claim 13, wherein the end effector is a rotary brush.

* * * * *